US012589874B2

(12) United States Patent　　　　(10) Patent No.:　US 12,589,874 B2
Lewis　　　　　　　　　　　　　　　(45) Date of Patent:　　Mar. 31, 2026

(54) PASSENGER SERVICE UNIT PASSENGER ASSIST APPARATUS

(71) Applicant: The Boeing Company, Arlington, VA (US)

(72) Inventor: Nicholas Lewis, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/522,904

(22) Filed: Nov. 29, 2023

(65) Prior Publication Data

US 2025/0171150 A1　　May 29, 2025

(51) Int. Cl.
B64D 11/00　　　(2006.01)
(52) U.S. Cl.
CPC .................................. B64D 11/00 (2013.01)
(58) Field of Classification Search
CPC . B64D 11/00; B64D 11/003; B64D 2011/005; B64D 2011/004; B60N 3/02; B60N 3/026
See application file for complete search history.

(56) References Cited

U.S. PATENT DOCUMENTS

| | | | |
|---|---|---|---|
| 11,780,356 B1 * | 10/2023 | Salter ....................... | B60Q 3/57 |
| | | | 296/1.02 |
| 2006/0214055 A1 * | 9/2006 | Novak ................. | B64D 11/003 |
| | | | 244/118.5 |

| | | | |
|---|---|---|---|
| 2015/0035424 A1 * | 2/2015 | Rittner ................. | B64D 11/003 |
| | | | 312/327 |
| 2015/0097082 A1 | 4/2015 | Paulino et al. | |
| 2016/0144801 A1 * | 5/2016 | Huelke ............... | B60R 13/0206 |
| | | | 24/295 |
| 2016/0297525 A1 * | 10/2016 | Walton ............... | B64D 11/0023 |
| 2019/0103043 A1 * | 4/2019 | O'Kell ................... | B64D 45/00 |
| 2021/0001984 A1 * | 1/2021 | Nicks .................... | B64D 11/00 |
| 2022/0411062 A1 * | 12/2022 | Fabry ................ | B64D 11/0626 |

FOREIGN PATENT DOCUMENTS

| | | |
|---|---|---|
| DE | 202019000091 U1 | 4/2019 |
| EP | 2814737 B1 | 9/2017 |

OTHER PUBLICATIONS

EP Search Report mailed Mar. 17, 2025 in re EP Application No. 24215725.3.

* cited by examiner

*Primary Examiner* — Nicholas McFall
*Assistant Examiner* — Justin Michael Heston
(74) *Attorney, Agent, or Firm* — COATS & BENNETT, PLLC

(57) ABSTRACT

An aircraft passenger cabin passenger service assembly is disclosed comprising a passenger service assembly panel having a deployable handle from a stowed configuration that is configured to facilitate and increase passenger maneuverability and stability into and out from passenger seats.

22 Claims, 10 Drawing Sheets

100

102 — POSITION PSU TROUGH COVER ASSEMBLY PANEL INTO ASSEMBLY

104 — ENGAGE PSU TROUGH COVER ASSEMBLY PANEL WITH ASSEMBLY STRUCTURAL SUPPORT ELEMENT

200

202 — PROVIDE PSU TROUGH COVER PANEL WITH PANEL HANDLE IN RECESS IN STOWED HANDLE CONSTRUCTION

204 — DEPLOY PANEL HANDLE FROM RECESS IN STOWED HANDLE CONFIGURATION INTO DEPLOYED HANDLE CONFIGURATION

206 — ENGAGE PSU TROUGH COVER PANEL AND HANDLE WITH WEIGHT LOAD

208 — STABILIZING A PASSENGER DURING PASSENGER INGRESS INTO AND/OR EGRESS FROM PASSENGER SEAT

PASSENGER SERVICE UNIT PASSENGER ASSIST APPARATUS

TECHNOLOGICAL FIELD

The present disclosure relates, generally, to the field of aircraft passenger cabin environment appointments. More specifically, the present disclosure relates to the field of passenger assist apparatuses located in an aircraft passenger cabin environment.

BACKGROUND

Aircraft passenger seating in passenger aircraft can typically comprise passenger seating that can further comprise a window seat adjacent a passenger aircraft outboard wall, an aisle seat situated proximate to an aircraft cabin aisle, and a center seat positioned between the window seat and the aisle seat. In typical aircraft configurations, the aisle seat typically offers the greatest ease, in terms of passenger egress from and ingress into the aisle seat. For example, the proximity of an aisle seat to the aisle, and the proximity of the aisle seat to outer edge of the overhead bin over the aisle seat, can afford an aisle seat occupant options, in the form of such aircraft cabin adjoining structures, with which to support and/or assist an aisle seat passenger during egress from and ingress into the aisle seat, and to otherwise facilitate passenger movement out of and into the aisle passenger seat.

Center passenger seats and window passenger seats are typically located beyond convenient passenger reach of any reliable structure that could assist window seat and center seat occupants during window and center seat entry and exit without, for example, interfering with or relying on a seat immediately in front of such window seat and/or center seat occupant.

Unless explicitly identified as such, no statement herein is admitted as prior art merely by its inclusion in the Technological Field and/or Background section.

SUMMARY

Present aspects are directed to an aircraft passenger cabin passenger service unit (referred to equivalently herein as "PSU") trough cover assembly including at least one passenger cabin passenger service unit trough cover assembly panel in the passenger service unit trough cover assembly of an aircraft passenger cabin, with the passenger service unit trough cover assembly located outboard of an overhead storage bin outboard end of an overhead storage bin, and with the passenger service unit trough cover assembly further located inboard of an aircraft passenger cabin outboard wall. The at least one passenger cabin passenger service unit trough cover assembly panel includes a passenger cabin passenger service unit trough cover assembly panel exterior surface facing into the aircraft passenger cabin, with at least one passenger cabin passenger service unit trough cover assembly panel exterior surface including a panel recessed area (referred to equivalently herein as "a recessed area" and a "panel recess"), with the panel recessed area at least partially bounded by a panel recessed area floor and a panel recessed area wall, with the panel recessed area dimensioned to house a passenger cabin passenger service unit trough cover assembly panel handle in a passenger cabin passenger service unit trough cover assembly panel handle stowed configuration, and wherein the passenger service unit trough cover assembly is configured to separate a passenger service unit trough from an aircraft passenger cabin.

In another present aspect, the passenger cabin passenger service unit trough cover assembly of further includes a plurality of passenger cabin passenger service unit trough cover assembly panels.

In another present aspect, the aircraft passenger cabin passenger service unit trough cover assembly further includes at least one of a lighting panel, a passenger information panel, a spacer panel, an oxygen deployment panel, air conditioning/blower vent, and a speaker panel.

In another present aspect, the aircraft passenger cabin passenger service unit trough cover assembly is a unitary assembly.

In a further present aspect, the passenger cabin passenger service unit trough cover assembly panel handle is configured to assist a passenger with at least one of a passenger ingress into a passenger seat and a passenger egress from a passenger seat.

In another present aspect, the plurality of passenger cabin passenger service unit trough cover assembly panels are discrete panels.

Another present aspect is directed to an aircraft passenger cabin including an aircraft passenger cabin passenger service unit trough cover assembly including at least one passenger cabin passenger service unit trough cover assembly panel in the passenger service unit trough cover assembly of an aircraft passenger cabin, with the passenger service unit trough cover assembly located outboard of an overhead storage bin outboard end of an overhead storage bin, and with the passenger service unit trough cover assembly further located inboard of an aircraft passenger cabin outboard wall. The at least one passenger cabin passenger service unit trough cover assembly panel includes a passenger cabin passenger service unit trough cover assembly panel exterior surface facing into the aircraft passenger cabin, with at least one passenger cabin passenger service unit trough cover assembly panel exterior surface including a panel recessed area, with the panel recessed area at least partially bounded by a panel recessed area floor and a panel recessed area wall, with the panel recessed area dimensioned to house a passenger cabin passenger service unit trough cover assembly panel handle in a passenger cabin passenger service unit trough cover assembly panel handle stowed configuration, and wherein the passenger service unit trough cover assembly is configured to separate a passenger service unit trough from an aircraft passenger cabin.

Another present aspect is directed to an aircraft including an aircraft passenger cabin passenger service unit trough cover assembly including at least one passenger cabin passenger service unit trough cover assembly panel in the passenger service unit trough cover assembly of an aircraft passenger cabin, with the passenger service unit trough cover assembly located outboard of an overhead storage bin outboard end of an overhead storage bin, and with the passenger service unit trough cover assembly further located inboard of an aircraft passenger cabin outboard wall. The at least one passenger cabin passenger service unit trough cover assembly panel includes a passenger cabin passenger service unit trough cover assembly panel exterior surface facing into the aircraft passenger cabin, with at least one passenger cabin passenger service unit trough cover assembly panel exterior surface including a panel recessed area, with the panel recessed area at least partially bounded by a panel recessed area floor and a panel recessed area wall, with the panel recessed area dimensioned to house a passenger cabin passenger service unit trough cover assembly panel handle in a passenger cabin passenger service unit trough cover assembly panel handle stowed configuration, and wherein the passenger service unit trough cover assembly is configured to separate a passenger service unit trough from an aircraft passenger cabin.

Another present aspect is directed to an aircraft passenger cabin passenger service unit trough cover assembly panel including a passenger service unit trough cover assembly panel exterior surface including a recessed area, with the recessed area configured/dimensioned to house a passenger service unit trough cover assembly panel handle in a passenger service unit trough cover assembly panel handle stowed configuration.

In another aspect, the aircraft passenger cabin passenger service unit trough cover assembly panel is located within a passenger service unit trough cover assembly of an aircraft passenger cabin, with the passenger service unit trough cover assembly located outboard of an overhead storage bin inboard end of an overhead storage bin, and with the passenger service unit trough cover assembly further located inboard of an aircraft passenger cabin outboard wall.

In another present aspect, the passenger service unit trough cover assembly panel handle is in communication with a signaling element, said signaling element configured to relay the condition of the passenger service unit trough cover assembly panel handle to a display.

In another present aspect, the passenger service unit trough cover assembly panel exterior surface is illuminated.

In another present aspect, the passenger service unit trough cover assembly panel exterior surface further comprises a luminescent material.

In another present aspect, the passenger service unit trough cover assembly panel exterior surface further comprises a fluorescent material.

In another present aspect, the passenger service unit trough cover assembly panel exterior surface further comprises a photoluminescent material.

In a further present aspect, the aircraft passenger cabin passenger service unit trough cover assembly panel further includes a passenger service unit trough cover assembly panel interior surface positioned immediately adjacent to a passenger service unit trough cover assembly panel support element, with the passenger service unit trough cover assembly panel support element configured to engage at least one of the at least one passenger service unit trough cover assembly panel interior surface and the passenger service unit trough cover assembly panel handle.

In another present aspect, the at least one passenger service unit trough cover assembly panel support element is further configured to support a weight imposed on the passenger service unit trough cover assembly panel handle.

In another present aspect, the at least one passenger service unit trough cover assembly panel support element is further configured to support a weight imposed on the passenger service unit trough cover assembly panel handle ranging from about 350 lbs to about 500 lbs.

In another present aspect, the passenger service unit trough cover assembly panel is configured to engage at least one passenger service unit trough cover assembly support element.

A further present aspect is directed to an aircraft passenger cabin including the aircraft passenger cabin passenger service unit trough cover assembly panel including a passenger service unit trough cover assembly panel exterior surface including a panel recessed area, with the panel recessed area configured to house a passenger service unit trough cover assembly panel handle in a passenger service unit trough cover assembly panel handle stowed configuration.

Another present aspect is directed to an aircraft including an aircraft passenger cabin passenger service unit trough cover assembly panel including a passenger service unit trough cover assembly panel exterior surface including a recessed area, with the recessed area configured/dimensioned to house a passenger service unit trough cover assembly panel handle in a passenger service unit trough cover assembly panel handle stowed configuration.

In another present aspect, the passenger service unit trough cover assembly structural support element is at least one of an AC rail and a passenger service unit rail.

In another present aspect, the passenger service unit trough cover assembly panel is configured to engage the AC rail, said passenger service unit trough cover assembly panel is further configured to further engage the passenger service unit rail.

In a further present aspect, the passenger service unit trough structural support element is configured to support the passenger service unit trough cover assembly.

Another present aspect is directed to a method for modifying a passenger service unit trough cover assembly in an aircraft passenger cabin, with the method including positioning the passenger service unit trough cover assembly panel in the passenger service unit trough cover assembly of an aircraft passenger cabin, with the passenger service unit trough cover assembly located outboard of an overhead storage bin outboard end of an overhead storage bin, with the passenger service unit trough cover assembly further located inboard of an aircraft passenger cabin outboard wall, with the passenger service unit trough cover assembly panel comprising a passenger service unit trough cover assembly panel exterior surface facing into the aircraft passenger cabin, with the passenger service unit trough cover assembly panel exterior surface including a panel recessed area, with the panel recessed area at least partially bounded by a panel recessed area floor and a panel recessed area wall, with the panel recessed area dimensioned to house a passenger service unit trough cover assembly panel handle in a passenger service unit trough cover assembly panel handle stowed configuration.

In a further present aspect, the method for modifying a passenger service unit trough cover assembly in an aircraft passenger cabin further includes engaging the passenger service unit trough cover assembly panel with at least one passenger service unit trough cover assembly structural support element, with the at least one passenger service unit trough cover assembly structural support element configured to support the passenger service unit trough cover assembly panel, with the passenger service unit trough cover assembly structural support element further configured to support a weight imposed on the passenger service unit trough cover assembly panel handle.

Another present aspect is directed to a method for assisting/stabilizing passenger ingress into and egress from an aircraft passenger seat assembly, with the method including deploying a passenger service unit trough cover assembly panel handle from a passenger service unit trough cover assembly panel, with the passenger service unit trough cover assembly panel handle deployed from a passenger service unit trough cover assembly panel handle stowed configuration to a passenger service unit trough cover assembly panel handle deployed configuration.

In another present aspect, the passenger service unit trough cover assembly panel is located in an aircraft passenger cabin at a location outboard of an overhead storage bin outboard end of an overhead storage bin, and further at a location inboard of an aircraft passenger cabin outboard wall, with the passenger service unit trough cover assembly panel comprising a passenger service unit trough cover assembly panel exterior surface facing into the aircraft passenger cabin, said passenger service unit trough cover assembly panel exterior surface comprising a panel recessed area, and with the panel recessed area dimensioned to house the passenger service unit trough cover assembly panel handle in a passenger service unit trough cover assembly panel handle stowed configuration.

In another present aspect, a method further includes engaging the passenger service unit trough cover assembly panel handle with a weight load of a passenger during at least one of a passenger ingress into a passenger seat assembly and passenger egress from the passenger seat assembly, and stabilizing a passenger during at least one of the passenger ingress into a passenger seat assembly and the passenger egress from the passenger seat assembly.

Another present aspect is directed to an aircraft passenger cabin overhead passenger seat ingress/egress stabilizer including an overhead panel located in an aircraft passenger cabin and at an aircraft passenger location, with the aircraft passenger cabin overhead passenger seat ingress/egress stabilizer located outboard of an outboard end of a storage bin, with the aircraft passenger cabin overhead passenger seat ingress/egress stabilizer further located inboard of an aircraft passenger cabin outboard wall, with the overhead panel including an overhead panel exterior surface facing into the aircraft passenger cabin, with the overhead panel exterior surface including a panel recessed area, with the panel recessed area at least partially bounded by a panel recessed area floor and a panel recessed area wall, and with the panel recessed area dimensioned to house an overhead panel handle within the panel recessed area in an overhead panel handle stowed configuration. The aircraft passenger cabin overhead passenger seat ingress/egress stabilizer panel handle is configured to at least support and/or stabilize a passenger during entry into and exit from a passenger seat.

Another present aspect is directed to an aircraft including the aircraft passenger cabin overhead passenger seat ingress/egress stabilizer.

The features, functions and advantages that have been discussed can be achieved independently in various aspects or may be combined in other aspects, further details of which can be seen with reference to the following description and the drawings.

BRIEF DESCRIPTION OF THE DRAWINGS

Figure 1:
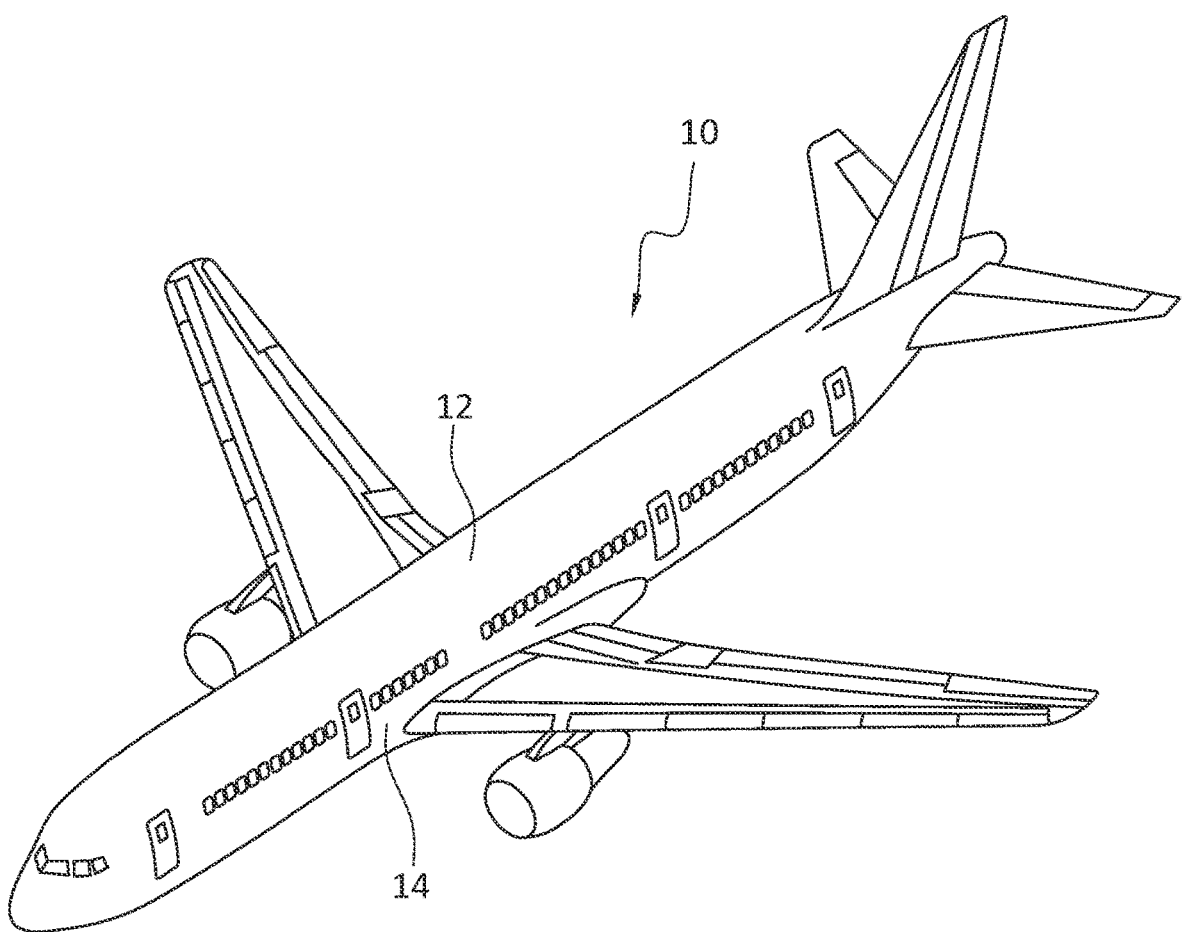
Figure 2A:
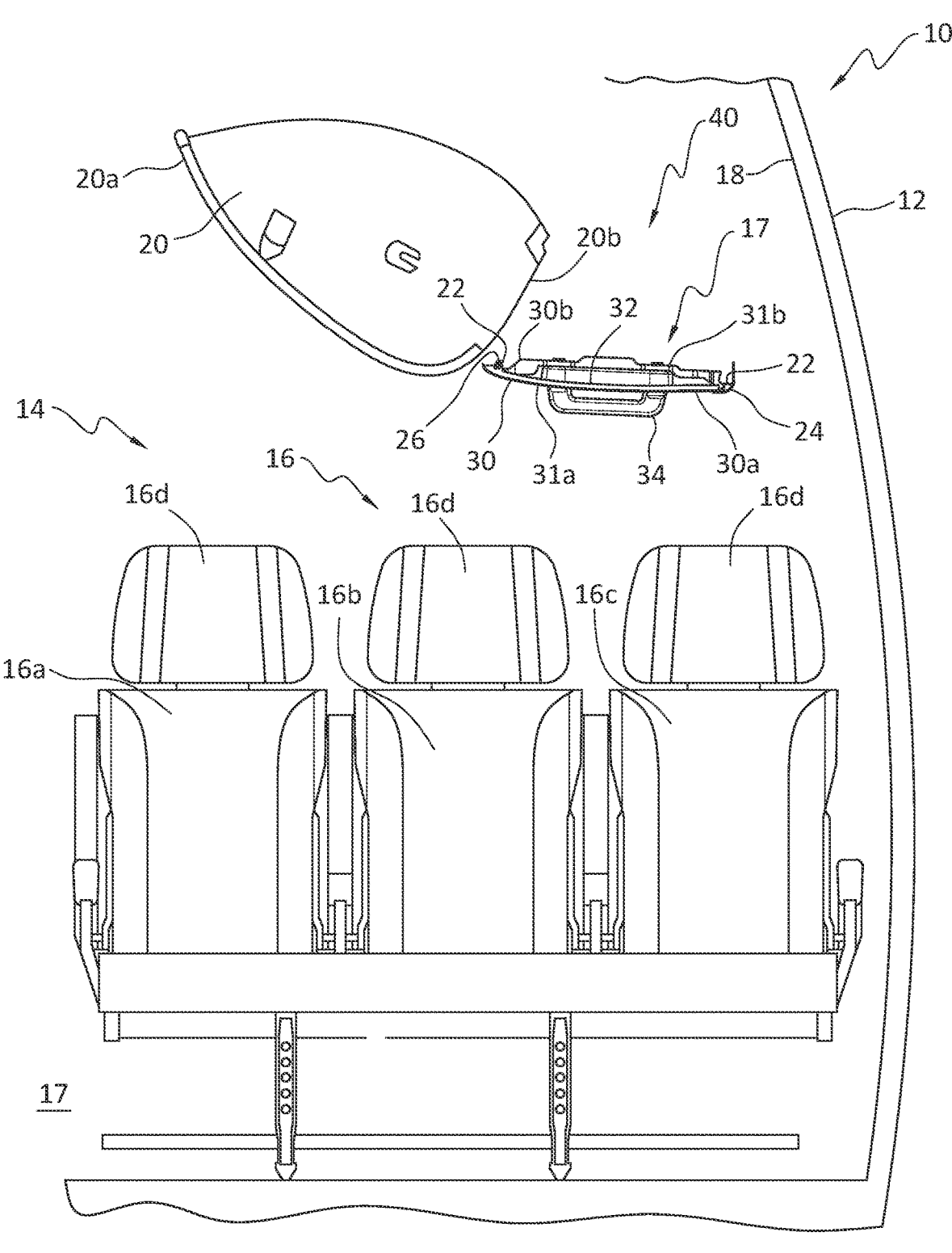
Figure 2B:
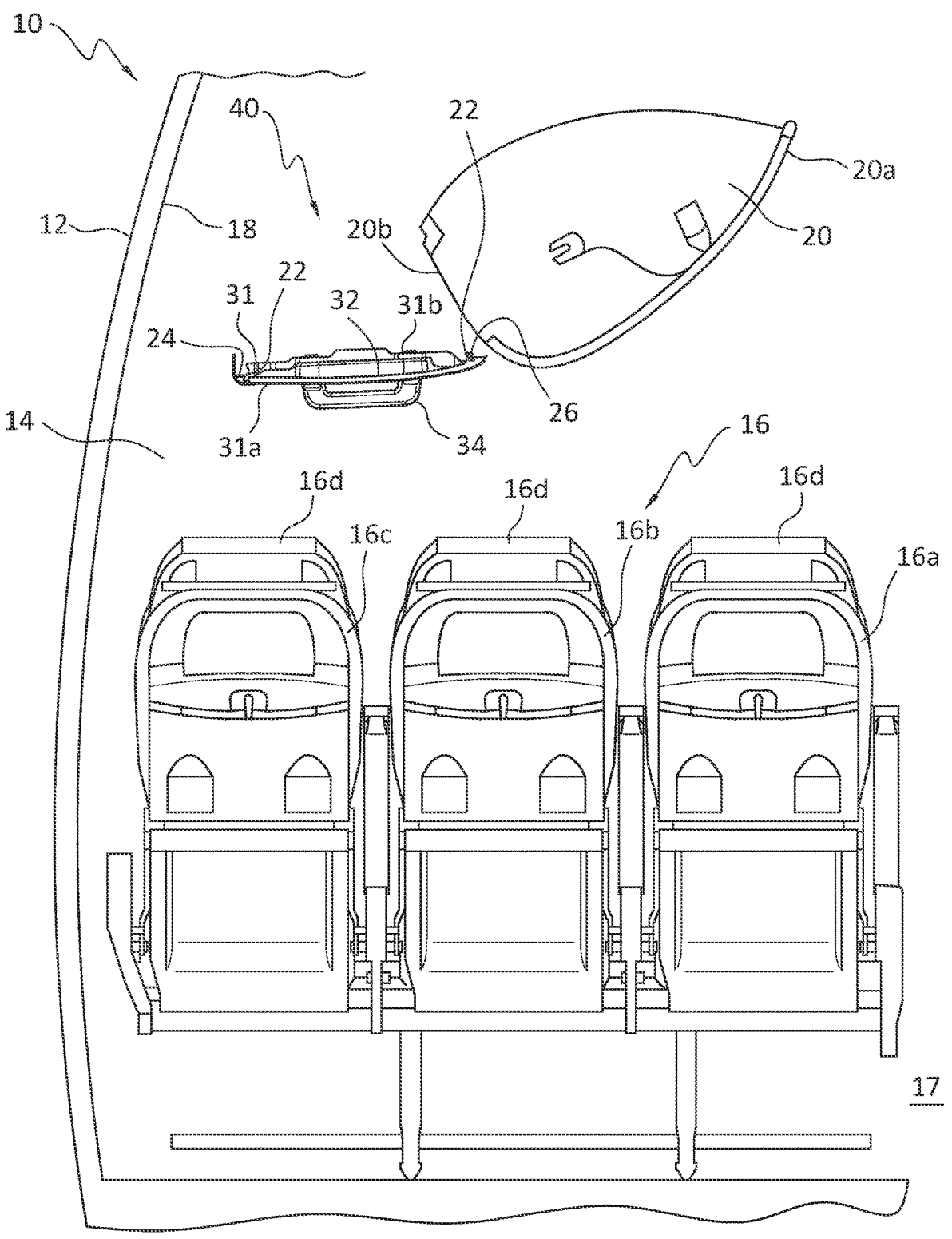
Figures 3, 4:
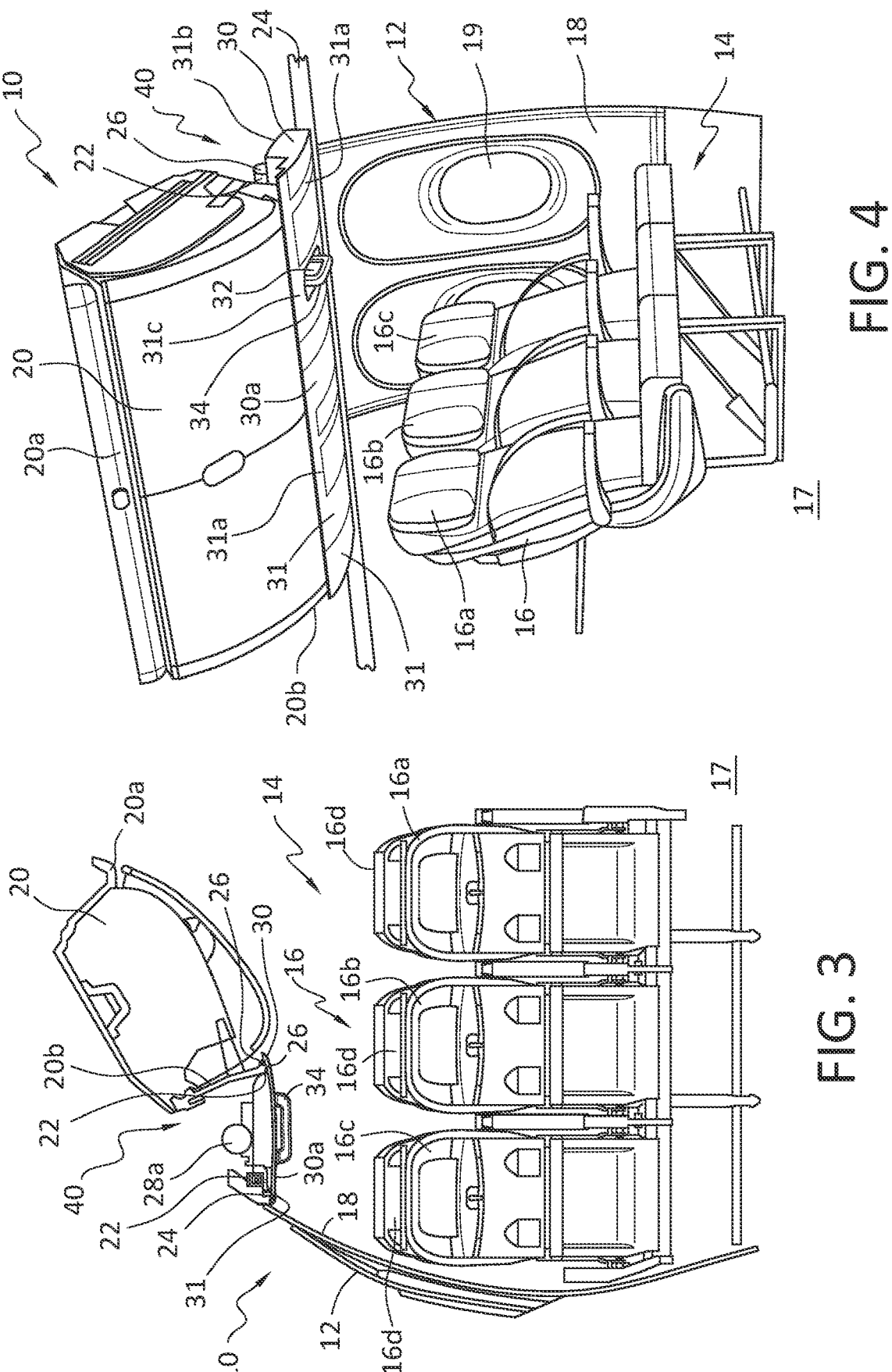
Figures 5, 6, 7:
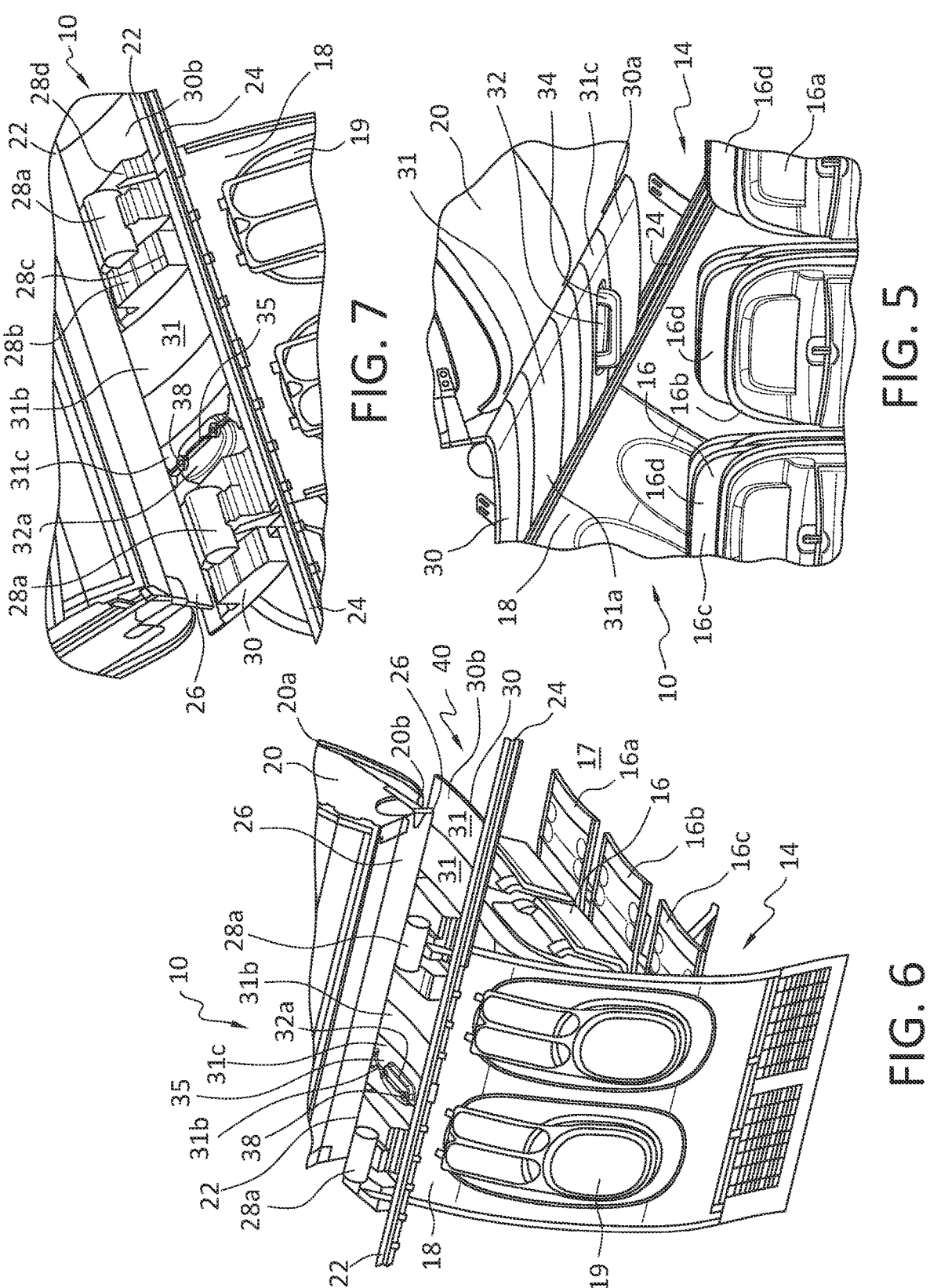
Figures 8A, 8B:
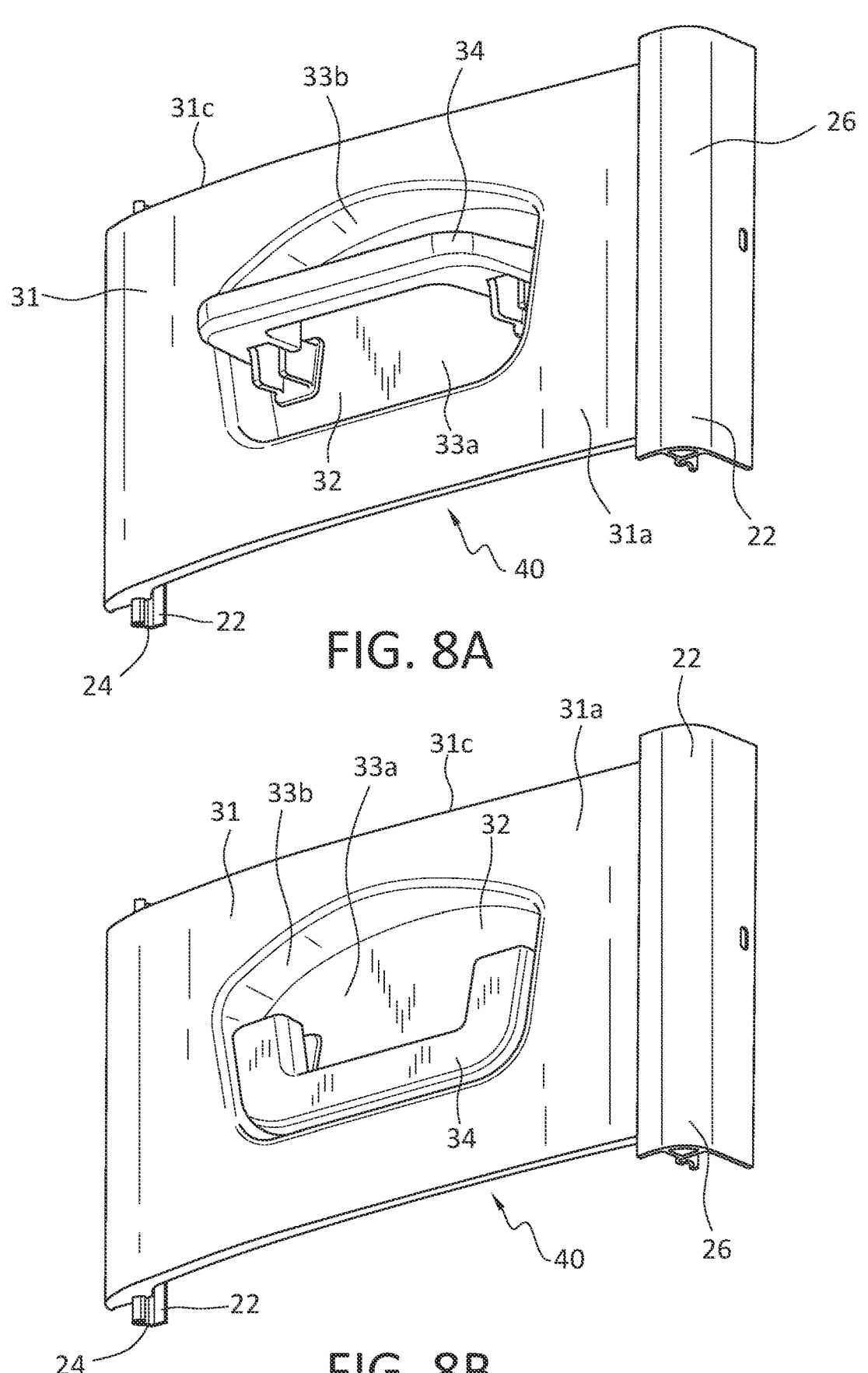
Figure 8C:
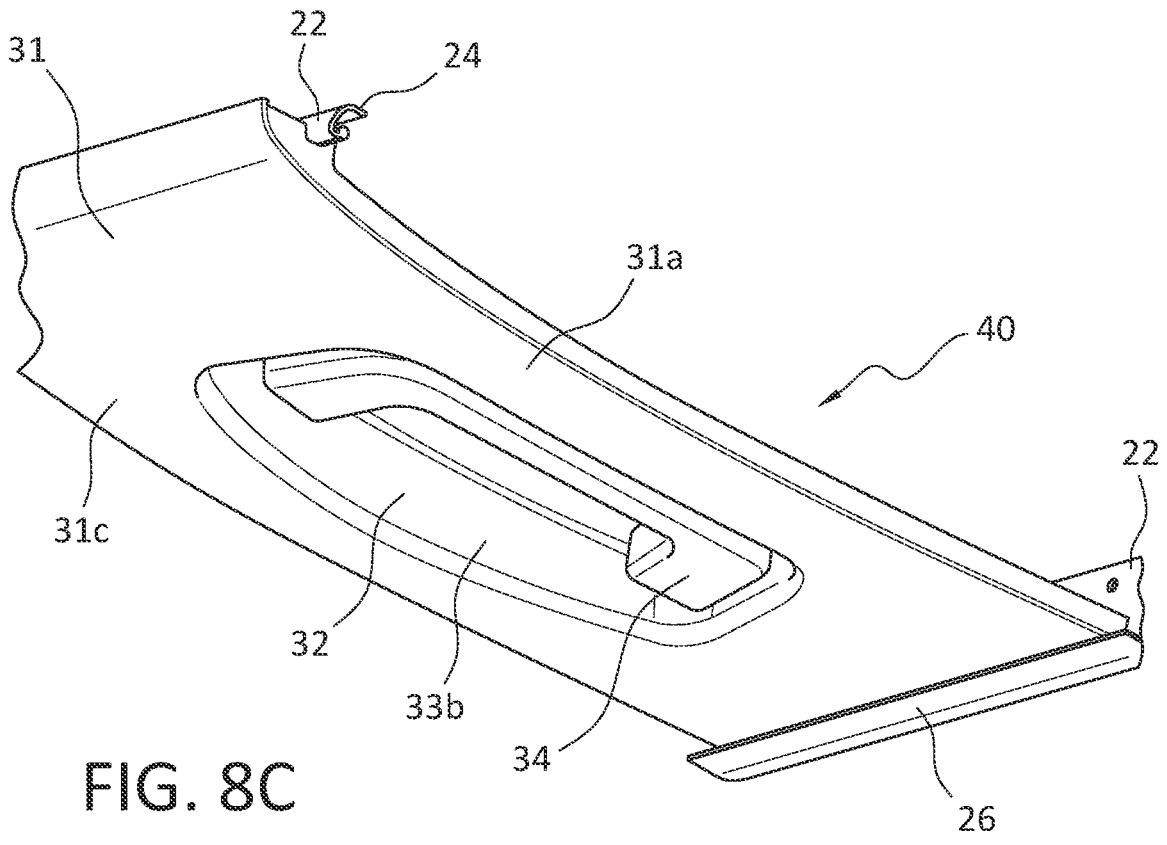
Figure 9:
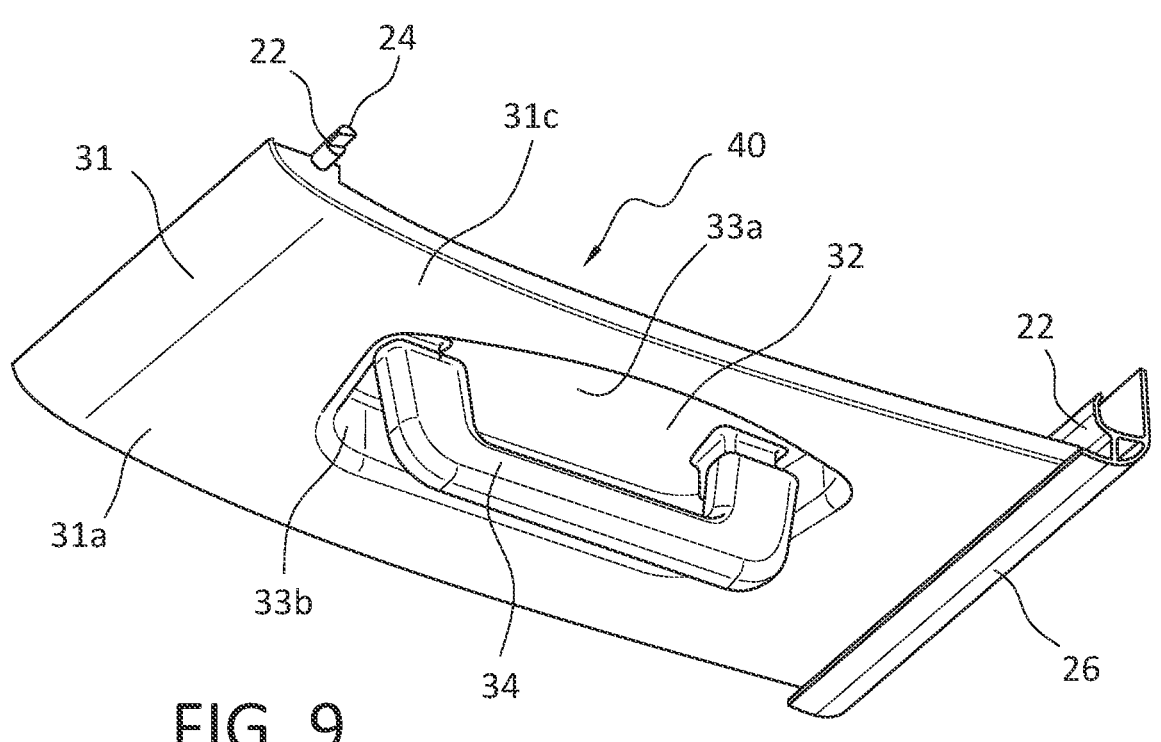
Figure 10:
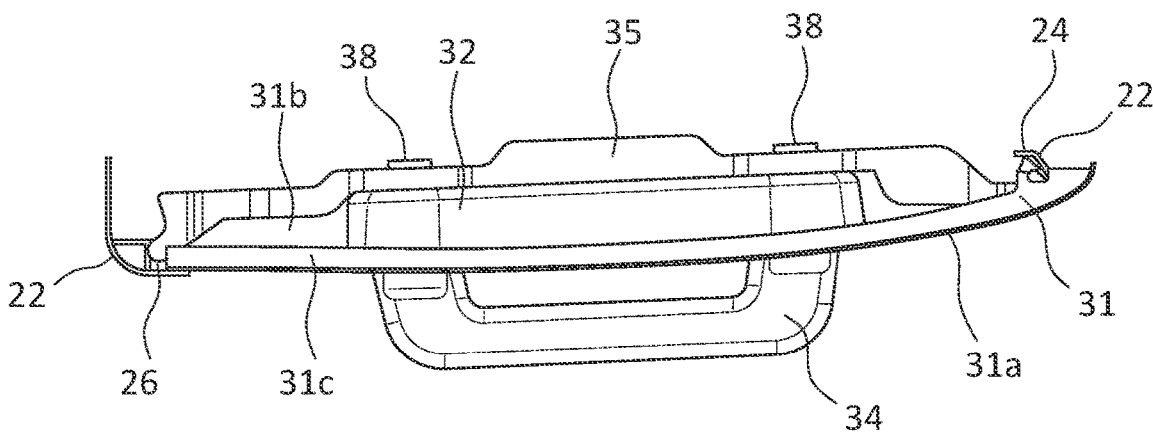
Figure 11:
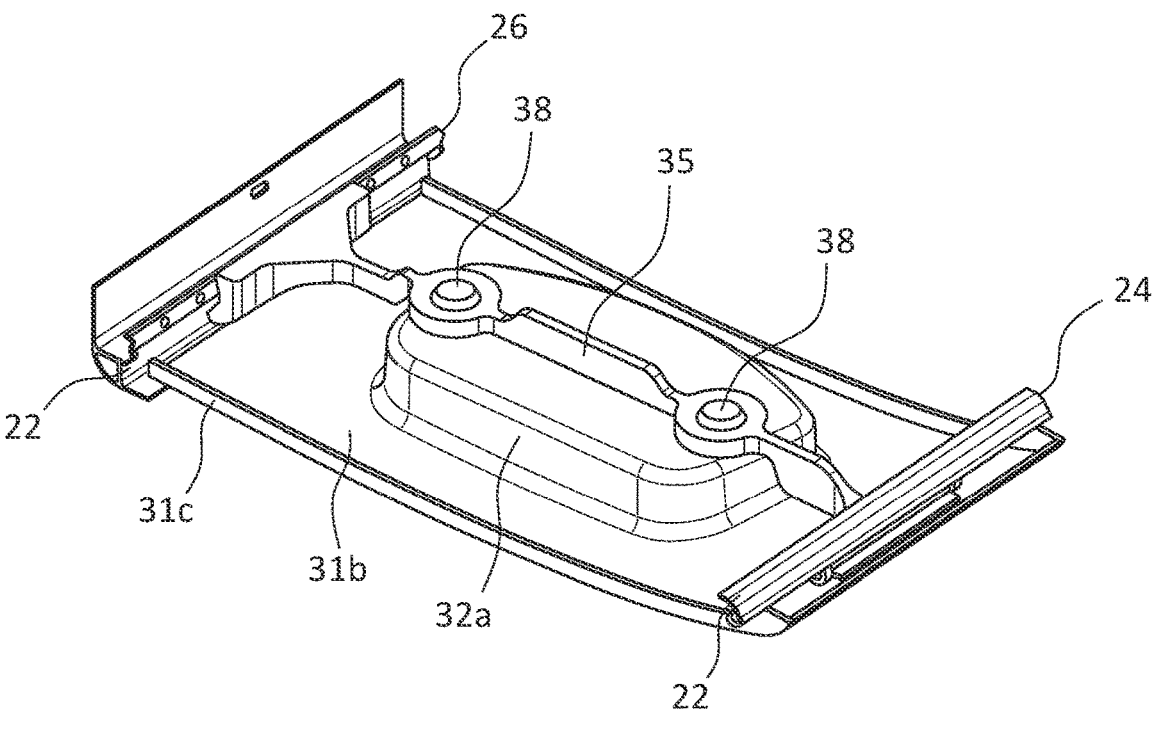
Figure 12:
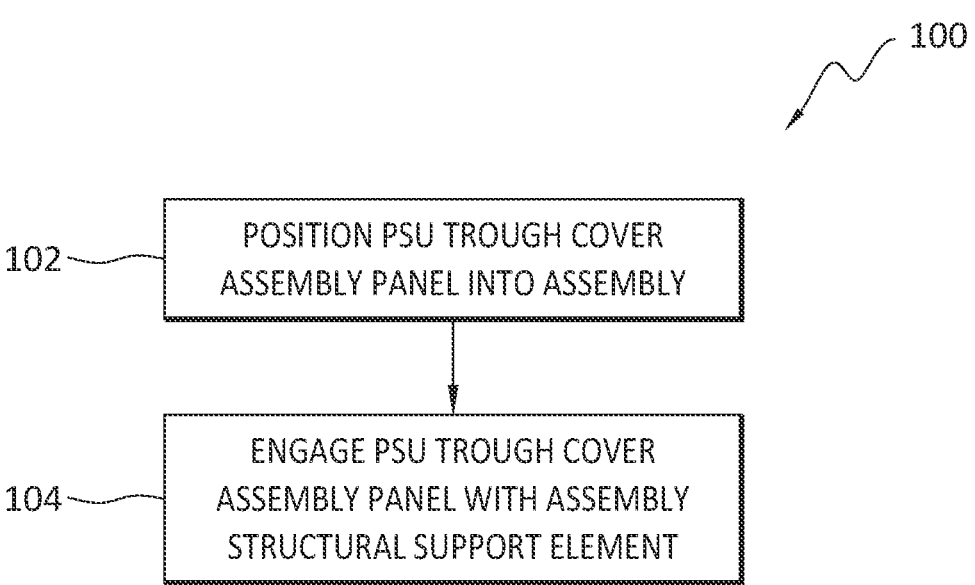

Having thus described variations of the disclosure in general terms, reference will now be made to the accompanying drawings, which are not necessarily drawn to scale, and wherein:

FIG. 1 is an illustration of a vehicle in the form of an aircraft, according to present aspects;

FIG. 2A is an illustration of a partial cross-sectional aft view from within an aircraft cabin interior of a vehicle of the type shown in FIG. 1, according to present aspects;

FIG. 2B is an illustration of a partial cross-sectional forward view from within an aircraft cabin interior of a vehicle of the type shown in FIG. 1, according to present aspects;

FIG. 3 is a further illustration of a partial cross-sectional forward view from within an aircraft cabin interior of a vehicle of the type shown in FIG. 1, according to present aspects;

FIG. 4 is a perspective outboard view from an aisle within an aircraft cabin interior of a vehicle of the type shown in FIG. 1, according to present aspects;

FIG. 5 is a partial perspective view of a PSU trough cover assembly in an aircraft cabin interior, according to present aspects;

FIG. 6 is a partial exposed view into an aircraft cabin interior further showing an exposed view of an aircraft cabin PSU trough and PSU trough cover assembly, according to present aspects;

FIG. 7 is an enlarged partial exposed view into an aircraft cabin interior further showing an exposed view of an aircraft cabin PSU trough and PSU trough cover assembly that can be of the type shown in FIG. 6, according to present aspects;

FIG. 8A is an enlarged plan view of a PSU trough cover assembly panel comprising an integrated handle in a deployed orientation, according to present aspects;

FIG. 8B is an enlarged plan view of a PSU trough cover assembly panel comprising an integrated handle in a stowed orientation within an integrated PSU trough cover assembly panel recess, according to present aspects;

FIG. 8C is an enlarged perspective view of a PSU trough cover assembly panel comprising an integrated handle in a stowed orientation within an integrated PSU trough cover assembly panel recess, according to present aspects;

FIG. 9 is an enlarged perspective view of a PSU trough cover assembly panel comprising an integrated handle in a deployed orientation within an integrated PSU trough cover assembly panel recess, according to present aspects;

FIG. 10 is a cross-sectional side view of a PSU trough cover assembly panel comprising an integrated handle in a deployed orientation within a PSU trough cover assembly panel recess, according to present aspects;

FIG. 11 is a perspective interior view of a PSU trough cover assembly panel comprising a PSU trough cover assembly panel support element fastened to a PSU trough cover assembly panel, according to present aspects;

FIG. 12 is a flowchart outlining a method according to present aspects; and

Figure 13:
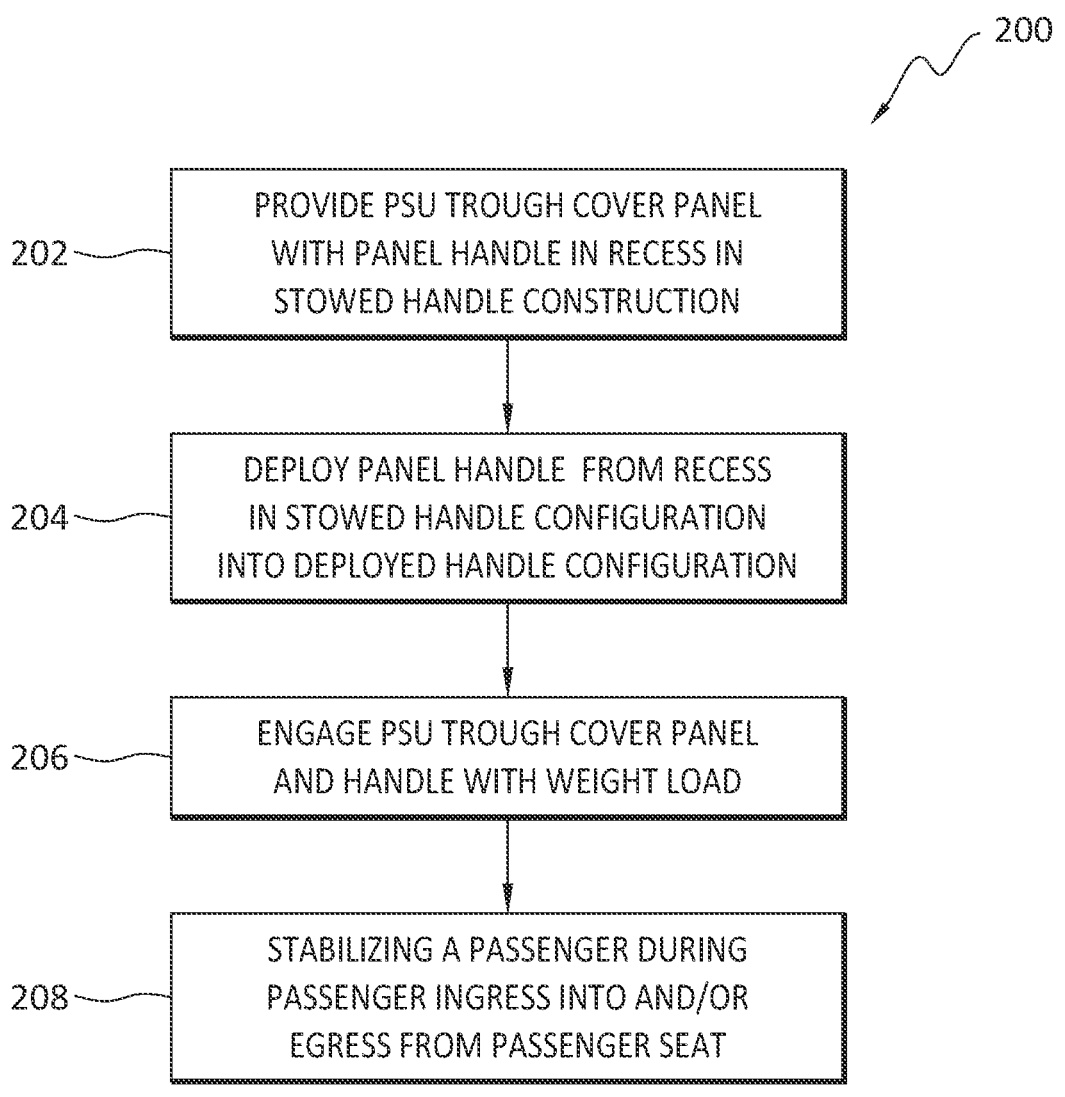

FIG. 13 is a flowchart outlining a method according to present aspects.

DETAILED DESCRIPTION

Entry into (referred to equivalently herein as "ingress into") and exit from (referred to equivalently herein as "egress from") aircraft passenger seating can require a significant amount of independent physical dexterity, especially for persons seated in the window seat and/or center seat of an aircraft passenger seat assembly. In addition, the time required to seat aircraft passengers as they enter an aircraft, and the time required to disembark passengers from an aircraft can result in significant lost time (e.g., including delayed take-off times and on-the-ground turn-around times, etc.) that can result in or otherwise contribute to cumulative significant delays, increased airline cost, and increased passenger inconvenience.

In addition, passengers that may be considered to be persons with restricted mobility (referred to equivalently as "PRMs"), and/or passengers having a diminished physical strength and/or physical ability can find it difficult to independently maneuver into or out from a window seat and/or center seat, as there is often nothing to "hold" onto that can offer such passengers seating and "de-seating" assistance and stability.

Present aspects are directed to the placement of a passenger assistance and stability device in the vicinity of, and within reach of, passengers seated and/or to be seated in window seats and/or center seats of a passenger aircraft cabin of a passenger aircraft. The present apparatuses can significantly increase passenger independence, passenger stability, and passenger maneuverability into and out from center and window aircraft passenger seats that was not previously possible without, for example, significant additional passenger assistance from, for example, aircraft personnel, other passengers, etc. That is, according to present aspects, significantly increased passenger self-assistance and self-stabilization (e.g., assistance and stabilization achieved under the passenger's "own power" and/or physical exertion, etc.) is conveniently and reliably afforded to passengers, including passengers seated in window passenger seating and center passenger seating.

FIG. 1 is a perspective view of a vehicle in the form of an aircraft 10 comprising a fuselage 12 and an aircraft passenger cabin 14 located inboard of an aircraft passenger wall that can be in communication with the fuselage.

FIG. 2A is a view looking aft from within aircraft passenger cabin 14 (referred to equivalently herein as "passenger cabin 14") of aircraft 10 with aircraft passenger cabin outboard wall 18 located inboard from the interior of and otherwise in communication with fuselage 12. As shown in FIG. 2A, seat assembly 16 as shown is a three-seat assembly having an aisle seat 16a adjacent an aisle 17, a window seat 16c adjacent the passenger cabin outboard wall 18, and a center seat 16b positioned between the aisle and window seats (16a and 16c, respectively). Each of the seats in the passenger seat assembly 16 further include a seat headrest 16d.

As further shown in FIG. 2A, overhead bin 20 is positioned in an aircraft passenger cabin, typically over one or more of the aisle and center passenger seats, with overhead storage bin having an overhead storage bin inboard end 20a (that can open and be accessed by, for example, a passenger standing in aisle 17), and an overhead storage bin outboard end 20b that can be suspended typically over a center seat, for example.

The area outboard of the overhead storage bin outboard end 20b and inboard of a fuselage interior (and inboard of an outboard wall that can be in communication with a fuselage) is generally referred to as a passenger service unit (PSU) trough 40 that can extend longitudinally along the length of a passenger aircraft cabin and that can be at least partially defined by the overhead storage bin outboard end 20b, the fuselage 12 or an outboard cabin wall 18, and a PSU trough cover assembly 30. The PSU trough 40 is a region within an aircraft that can house and can otherwise include various equipment, assemblies, assembly components, etc., that can include, for example, electrically-assisted assemblies and assembly components that can further include, for example, a speaker assembly, a lighting assembly, an illuminated passenger information/warning indicator assembly, a passenger assistance call assembly, an air vent assembly, air-conditioning, etc. The PSU trough can further include an oxygen delivery assembly, an oxygen tank, a fire suppression delivery device, etc.

The PSU trough cover assembly 30 can be modified to allow visual and tactile access to a passenger located in proximity to (typically beneath) a particular region of the trough cover assembly. The PSU trough cover assembly can comprise a plurality of discrete PSU trough cover assembly panels that, when brought into contact with one another, and/or when attached together (including, for example fixedly attached together) can form the PSU trough cover assembly 30. Various PSU trough cover assembly panels can be dedicated panels that can be selected and dedicated to deliver a selected passenger-targeted function and/or comfort (including, for example, sight signaling, sound/spoken information/music, oxygen delivery, air circulation delivery, air conditioning delivery, flight crew assistance notification, etc.).

For example, the location within a PSU trough, of one or more PSU assemblies, can co-exist with a proximately-located PSU trough cover assembly panel-type of a PSU trough cover assembly. PSU panels can, for example, include: 1) openings to facilitate sound passage for a proximately located sound speaker; 2) openings in the form of vented openings in communication with an air delivery assembly—e.g., a "blower" including a blower to deliver conditioned air as well as recirculated air, etc.; 3) lenses to facilitate light passage when indicators are powered; 4) lenses to facilitate illumination-reading and/or cabin illumination lights; 4) oxygen delivery if cabin environments require the deployment of auxiliary oxygen; and other modifications, etc.

In addition, where no functional assembly exists at a position along and within a PSU trough, a "spacer" PSU panel can be incorporated into the PSU trough cover assembly. Such "spacer" panels typically perform or facilitate no secondary function other than offering continuity, structural consistency, etc., for the PSU trough cover assembly, and overall aesthetic design and/or overall cabin ambiance.

Present aspects are directed to the specialized modification of and increased functionality of a PSU tough cover assembly panel, that can be a PSU spacer panel, for the purpose of increasing passenger independence and comfort and maneuverability into and out from passenger seating. According to a present aspect, a PSU trough cover assembly panel incorporates a handle that can be a retractable handle that is housed within a PSU trough cover assembly panel recess when in a stowed configuration. According to present aspects, the PSU trough cover assembly panel incorporates a retractable handle movable from the stowed configuration to a deployed configuration that can be "gripped" and/or otherwise engaged by a passenger. The PSU trough cover assembly panel handle can be load-bearing handle and assembly configured to support a downward force, in the form of, for example, a passenger weight ranging from about 250 pounds to about 350 pounds, or more. In another example, The PSU trough cover assembly panel handle can be load-bearing handle and assembly configured to support a downward force, in the form of, for example, a passenger weight ranging from about 350 pounds to about 500 pounds.

Returning to the FIGS., FIG. 2A shows a cross-sectional end view of PSU trough cover assembly 30 having a PSU trough cover assembly exterior surface 30a facing into passenger cabin 14 and a PSU trough cover assembly interior surface 30b facing into the PSU trough 40. FIG. 2A further shows a cross-section end view of PSU trough cover assembly panel 31 having a PSU trough cover assembly panel exterior surface 31a facing into passenger cabin 14 and a PSU trough cover assembly panel interior surface 31b facing into the PSU trough 40. PSU trough cover assembly panel 31 further comprises PSU trough cover assembly panel recess 32 (referred to equivalently herein as "panel recess 32") dimensioned to house PSU trough cover assembly panel handle 34 in a stowed configuration within PSU trough cover assembly panel recess 32 (referred to equivalently herein as "recess 32" and "recessed area 32").

As shown in FIG. 2A, as the PSU trough cover assembly panel handle 34 is moved from the stowed configuration within the panel recess 32 toward the deployed configuration (shown in FIG. 2A), the PSU trough cover assembly panel handle 34 can pivot about a handle attachment point (that can attach the handle to at least one of the panel and/or a panel support element that can be located immediately adjacent and/or otherwise in communication with the PSU trough cover assembly panel interior surface 31*b*), with the handle 34 extending downward from the panel recess 32 and into the aircraft passenger cabin and toward a passenger seat assembly 16. According to a present aspect, PSU trough cover assembly 30 is maintained in an elevated position in the aircraft cabin and can be suspended from and otherwise in communication with and/or in fixed attachment to a PSU trough cover assembly support 22 that can be an air conditioning extrusion rail (referred to equivalently herein as an "AC rail" 24) that can extend longitudinally along and within the PSU trough 40. PSU trough cover assembly 30 can further be maintained in an elevated position in the aircraft cabin and can be suspended from and otherwise in communication with and/or in fixed attachment to a PSU trough cover assembly support 22 that can be a PSU rail 26 adjacent the overhead storage bin outboard end 20*b* and that also can extend longitudinally along and within PSU trough 40.

FIG. 2B is a view looking forward from within aircraft passenger cabin 14 of aircraft 10 of the type shown in FIGS. 1 and 2A, with aircraft passenger cabin outboard wall 18 located inboard from the interior of and otherwise in communication with fuselage 12. As shown in FIG. 2B seat assembly 16 as shown is a three-seat assembly having an aisle seat 16*a* adjacent an aisle 17, a window seat 16*c* adjacent the passenger cabin outboard wall 18, and a center seat 16*b* positioned between the aisle and window seats (16*a* and 16*c*, respectively). Each of the seats in the passenger seat assembly 16 further include a seat headrest 16*d*.

As further shown in FIG. 2B, overhead bin 20 is positioned in an aircraft passenger cabin 14 typically over one or more of the aisle and center passenger seats, with overhead storage bin having an overhead storage bin inboard end 20*a* (that can open and be accessed by, for example, a passenger standing in aisle 17), and an overhead storage bin inboard end 20*a* that can be suspended typically over a center seat, for example. FIG. 2B further shows the AC rail 24 and PSU rail 26 as types of PSU trough cover assembly support elements 22 configured to support and suspend the PSU trough cover assembly 30 in position within the aircraft passenger cabin 14.

FIG. 3, similar to FIG. 2B, is a further view looking forward from within aircraft passenger cabin 14 of aircraft 10 with aircraft passenger cabin outboard wall 18 located inboard from the interior of and otherwise in communication with fuselage 12. As shown in FIG. 3, a deployable oxygen assembly 28*a* is positioned in the area within the PSU trough 40 and further positioned immediately adjacent the PSU trough cover assembly 30, with the oxygen assembly 28*a* representing any of the assemblies that can occupy the PSU trough 40 and that are configured to rest adjacent or be integral with a PSU trough cover assembly panel 30 and deliver services, comforts, and/or information, etc., to a passenger including, for example, sight signaling, sound/spoken information/music, oxygen delivery, air circulation delivery, air conditioning delivery, flight crew assistance notification, etc., as described herein.

FIG. 4 is an outboard view from within an aircraft passenger cabin 14 (e.g., as viewed from an inboard position that can be, for example, from an aisle 17) in an aircraft 10 that can be of type shown in FIGS. 1, 2A, 2B, 3. FIG. 4 shows the passenger cabin outboard wall 18, seat assembly 16 and aircraft passenger cabin window 19. FIG. 4 further shows PSU trough cover assembly exterior surface 30*a* of PSU trough cover assembly 30 and PSU trough cover assembly panel exterior surface 31*a* of the various PSU trough cover assembly panels 31 that, taken together, can comprise the PSU trough cover assembly 30. FIG. 4 further shows a present specialized and/or modified spacer panel in the form of PSU trough cover assembly panel 31*c* that further includes a panel recess 32 and PSU trough cover assembly panel handle 34 extending downwardly from panel recess 32 with the PSU trough cover assembly panel handle 34 shown in the deployed configuration (e.g., extending downwardly from and partially visible "out of" panel recess 32).

FIG. 5 is a partial forward view of aircraft passenger cabin 14 of an aircraft 10, with FIG. 5 showing seat assembly 16 with window seat 16*c* positioned adjacent passenger cabin outboard wall 18, with window seat 16*c* and center seat 16*b* positioned substantially below PSU trough cover assembly panel 31*c*, with the location of the PSU trough cover assembly panel 31*c* positioned within the extended reach of a passenger that can occupy seats 16*c*, 16*b*, for example. PSU trough cover assembly panel 31*c*, as shown in FIG. 5, includes a panel recess 32 and PSU trough cover assembly panel handle 34 extending downwardly from panel recess 32 with the PSU trough cover assembly panel handle 34 shown in the deployed configuration (e.g., extending downwardly from and partially visible extending "out of" panel recess 32).

FIGS. 6 and 7 are partially exposed views from above and into PSU trough 40 of an aircraft 10. FIG. 6, shows a partial view into aircraft passenger cabin 14 from outside aircraft 10 with a fuselage section removed to reveal an aircraft passenger cabin outboard wall 18 and aircraft passenger cabin window 19. An aircraft crown (not shown in FIG. 6) is also removed to reveal PSU trough 40 with PSU trough cover assembly interior surface 30*b* of PSU trough cover assembly 30 facing into PSU trough 40, and with PSU trough cover assembly panel interior surface 31*b* of PSU trough cover assembly panels 31 facing into PSU trough 40. FIG. 6 further shows the present specialized and/or modified spacer panel in the form of PSU trough cover assembly panel 31*c* that is a reverse view of PSU trough cover assembly panel 31*c* as compared to the view shown in FIG. 4, and showing PSU trough cover assembly panel interior surface 31*b* facing into PSU trough 40.

FIG. 6 further shows raised area 32*a* of panel 31*c* facing into PSU trough 40, with raised area 32*a* on PSU trough cover interior surface 31*b* of panel 31*c* corresponding to the depressed or recessed area 32 on the PSU trough cover assembly panel exterior surface 31*a* (facing into aircraft passenger cabin 14) of PSU trough cover assembly panel 31*c* that forms panel recess 32, and that is dimensioned and otherwise configured to house the trough cover assembly panel handle 34, as described herein. As shown in FIG. 6, PSU trough cover assembly panel 31*c* can be reinforced to bear a downward weight load that other PSU trough cover assembly panels 31 are not expected to sustain.

As shown in FIG. 6, PSU trough cover assembly panel 31*c* is shown fixedly attached via fasteners 38 to a PSU trough cover assembly panel support element 35 that engages or is otherwise fixedly attached to PSU trough cover assembly support element 22 (that can be in the form of the AC rail 24 and the PSU rail 26, for example). As explained herein, in one example, the PSU trough cover assembly panel support element 35 provides a degree of support to the PSU trough cover assembly panel 31*c*, to which the support element is attached. According to one example, the degree of support provided by the PSU trough cover assembly panel support element 35 to the panel 31*c* is configured to at least withstand a downward load-bearing force (e.g., a "passenger weight") on the PSU trough cover assembly panel 31*c* ranging from about 350 lbs. to about 500 lbs.

FIG. 7 is an alternate partially exposed view from above and into PSU trough 40 and into aircraft passenger cabin 14 from outside and into aircraft 10 with a fuselage section removed to reveal an aircraft passenger cabin outboard wall 18 and aircraft passenger cabin window 19, and with a section of the aircraft crown removed to reveal PSU trough 40 with PSU trough cover assembly interior surface 30*b* of PSU trough cover assembly 30 and with facing into PSU trough 40 (and with PSU trough cover assembly panel interior surface 31*b* of PSU trough cover assembly panels 31 facing into PSU trough 40. The PSU trough cover assembly panel support element 35 fixedly attached to trough cover assembly panel 31*c* via fasteners 38 is further shown, similar to the view shown in FIG. 6 and described herein. FIG. 7 further shows PSU assemblies that can rest adjacent to or be integral with PSU trough cover assembly and panel, with the PSU assemblies shown as being a deployable oxygen assembly 28*a*, a lighting assembly 28*b*, a passenger notification assembly 28*c*, a speaker 28*d*, and can further, for example, a vent (e.g. a blower vent assembly, not shown in the FIGS.). Further PSU assemblies not specifically shown can include, for example, air-conditioning and/or recirculating air blowers and/or vents, etc.

FIGS. 8A, 8B, 8C, 9, 10, and 11 are enlarged plan view illustrations of PSU trough cover assembly panel 31*c*, according to present aspects. As shown in FIG. 8A, PSU trough cover assembly panel 31 is a PSU trough cover assembly panel 31*c* that, according to present aspects, includes a PSU trough cover assembly panel recess 32 (referred to equivalently herein as "panel recess 32") with PSU trough cover assembly panel handle 34 (referred to equivalently herein as "panel handle 34") shown pivotably engaged within panel recess 32, and with panel handle 34 shown in a deployed configuration with panel handle 34 extending from panel recess 32. PSU trough cover assembly panel 31*c* further includes PSU trough cover assembly panel exterior surface 31*a* that (when the panel is in position and integrated into a PSU trough cover assembly) would face into an aircraft passenger cabin, as described herein.

The PSU trough cover assembly panel 31*c*, as shown in FIG. 8A, and when in position in the PSU trough cover assembly, is configured to engage at least one PSU trough cover assembly support element 22, that can be at least one of an AC rail 24 and a PSU rail 26. In another example, PSU trough cover assembly 30 and PSU trough cover assembly panel 31, is configured to engage more than one PSU trough cover assembly support element 22, and can engage both of an AC rail 24 and a PSU rail 26. FIG. 8A further shows the panel recess 32 at least partially bounded by panel recess floor 33*a* and panel recess wall 33*b*.

FIG. 8B shows the features of the PSU trough cover assembly panel 31*c* as shown in FIG. 8A, with the PSU trough cover assembly panel handle 34 now in the stowed configuration, and with the PSU trough cover assembly panel handle 34 configured to rest within PSU trough cover assembly panel recess 32 and substantially rest adjacent panel recess floor 33*a*, and with the PSU trough cover assembly panel handle 34 in the stowed configuration with panel recess 32 configured to rotatably pivot into and toward the stowed configuration shown in FIG. 8B from the deployed configuration (shown in FIG. 8A).

As shown in FIG. 8B, the PSU trough cover assembly panel handle 34 is configured to retract toward and into the stowed configuration (from the deployed configuration, for example) and can be in communication with a retaining and/or retracting mechanism to maintain the PSU trough cover assembly panel handle in the stowed configuration. The retaining and/or retracting mechanism (not shown in the FIGS.) can be, for example, a spring-loaded mechanism or other mechanism configured to deliver a force that can be a counter force or a "returning force" that can counter a manual "downward" force exerted on the handle by, for example, a passenger, and that is required to move the PSU trough cover assembly panel handle from and out of the stowed configuration and toward and into the deployed configuration.

FIG. 8C is an upward view (from "underneath" or from "below") of the PSU trough cover assembly panel 31*c*, that can be a view of the PSU trough cover assembly panel 31*c*, for example, in position in a PSU trough cover assembly 30 that is configured to "cover" or at least partially "bound" a PSU trough 40 when the PSU trough cover assembly 30 and assembly panel 31 (shown in FIGS. 8A, 8B, 8C as a modified panel 31 that includes the handle 34 and that is referred to herein also as the PSU trough cover assembly panel 31*c*). As shown in FIGS. 8A, 8B, and 8C, the PSU trough cover assembly panel 31*c* is installed into position and supported in position, for example, by the PSU trough cover assembly support elements 22 that can be the AC rail 24 and the PSU rail 26 that extend longitudinally and are otherwise longitudinally disposed along and within a selected length of the PSU trough 40.

As shown in FIG. 8C, the PSU trough cover assembly panel handle 34 is in the stowed configuration, with the PSU trough cover assembly panel handle 34 substantially completely retained or "housed" within the PSU trough cover assembly panel recess 32. As shown at least in FIGS. 8B and 8C, when the PSU trough cover assembly panel handle 34 is in the stowed configuration, and is substantially completely retained or "housed" within the PSU trough cover assembly panel recess 32, the PSU trough cover assembly panel handle 34 is configured to not extend beyond the plane of the PSU trough cover assembly panel exterior surface 31*a*.

FIG. 9 is an illustration of the PSU trough cover assembly panel 31*c* shown at least on in FIGS. 8A, 8B, 8C, with FIG. 9 showing an upward view (from "underneath" or from "below") of the PSU trough cover assembly panel 31*c*, that can be a view of the PSU trough cover assembly panel 31*c*, for example, in position in a PSU trough cover assembly 30 that is configured to "cover" or at least partially "bound" a PSU trough 40 when the PSU trough cover assembly 30 and assembly panel 31*c* is installed in position and supported in position, for example, by the PSU trough cover assembly support elements 22 that can be the AC rail 24 and the PSU rail 26 that extend longitudinally and are otherwise longitudinally disposed along and within a selected length of the PSU trough 40. As shown in FIG. 9, the PSU trough cover assembly panel handle 34 is in the deployed configuration, with the PSU trough cover assembly panel handle 34 configured to extend a selected distance out from the PSU trough cover assembly panel recess 32 and to extend beyond the plane of the PSU trough cover assembly panel exterior surface 31a (in the deployed configuration).

FIG. 10 is an enlarged cross-sectional side view of the PSU trough cover assembly panel 31c having a PSU trough cover assembly panel exterior surface 31a (facing, for example, into a passenger cabin) and a PSU trough cover assembly panel interior surface 31b (facing, for example, into a PSU trough). As shown in FIG. 10, a PSU trough cover assembly panel support element 35 is in communication with and otherwise fixedly attached to PSU trough cover assembly panel 31c via, for example, fasteners 38, with fasteners 38 and the PSU trough cover assembly panel support element 35 configured to withstand a load-bearing (e.g., a "downward") weight force ranging from about 350 to about 500 lbs. when, for example, such downward force is applied to or otherwise exerted upon the PSU trough cover assembly panel handle 34. As shown in FIG. 10, the PSU trough cover assembly panel support element 35 can be in the shape of an "I" beam that can extend across the width of the PSU trough cover assembly panel 31c, and that can extend from one PSU trough cover assembly support element 22 (e.g., a "first" PSU trough cover assembly support element 22, that can be in the form of, for example, an AC rail 24, etc.) to another PSU trough cover assembly support element 22 (e.g., a "second" PSU trough cover assembly support element 22, that can be in the form of, for example, a PSU rail 26, etc.).

As shown in FIG. 10, the PSU trough cover assembly panel 31c can be supported discretely or as a part of the PSU trough cover assembly 30 by one or more PSU trough cover assembly support elements 22 that can be an AC rail 24 and a PSU rail 26. The one or more PSU trough cover assembly support elements 22 are configured to extend longitudinally and are otherwise longitudinally disposed along and within a selected length of the PSU trough 40, and can be in communication with additional aircraft support elements including, for example, various frame/support elements not necessarily shown in the FIGS. In a present aspect, the PSU trough cover assembly panel support element 35 can be a discrete element that is fixedly attached to the PSU trough cover assembly panel 31c. In another present example, the PSU trough cover assembly panel support element 35 can be integral with the PSU trough cover assembly panel 31c such that the PSU trough cover assembly panel support element 35 and the PSU trough cover assembly panel 31c are a unitary structure.

FIG. 11 is a view of the PSU trough cover assembly panel 31c, according to present aspects viewed downwardly, for example, from within a PSU trough. FIG. 11 shows the PSU trough cover assembly panel 31c having a PSU trough cover assembly panel interior surface 31b. and a PSU trough cover assembly panel support element 35 in communication with and otherwise fixedly attached to PSU trough cover assembly panel 31c via, for example, fasteners 38, with fasteners 38 and the PSU trough cover assembly panel support element 35 configured to withstand a load-bearing (e.g., a "downward") weight force ranging from about 350 lbs. to about 500 lbs. when, for example, such downward force is applied to or otherwise exerted upon the PSU trough cover assembly panel handle 34, such as when a passenger is moving into or out from a seat and is supporting body weight, for example. According to a present aspect, a weight load applied to the PSU trough cover assembly panel handle is configured to transfer at least in part from the PSU trough cover assembly panel support element 35 to one or more of the PSU trough cover assembly support elements 22.

FIG. 11 further shows PSU trough cover assembly panel 31c supported by one or more PSU trough cover assembly support elements 22 that can be an AC rail 24 and a PSU rail 26. The one or more PSU trough cover assembly support elements 22 are configured to extend longitudinally and are otherwise longitudinally disposed along and within a selected length of the PSU trough 40, and can be in communication with additional aircraft support elements including, for example, various frame/support elements not necessarily shown in the FIGS. As shown in FIGS. 10 and 11, the PSU trough cover assembly panel support element 35 is fixedly attached to and is otherwise supported by one or more PSU trough cover assembly support elements 22 that can be an AC rail 24 and a PSU rail 26.

FIGS. 10 and 11 further show an elevated region along the profile of the PSU trough cover assembly panel interior surface 31b that is the PSU trough cover assembly panel recess raised area 32a that corresponds to the reverse or interior side (e.g., interior surface) of the PSU trough cover assembly panel recess 32 present on the PSU trough cover assembly panel exterior 31a (shown, for example, at least ion FIGS. 8A, 8B, 8C, and 9).

FIGS. 12 and 13 are flowcharts outlining present methods, according to further present aspects. As outlined in FIG. 12, a present aspect is directed to a method 100 for modifying a passenger service unit trough cover assembly 30 in an aircraft passenger cabin, with the method including positioning 102 the passenger service unit trough cover assembly panel 31 in the passenger service unit trough cover assembly 30 of an aircraft passenger cabin 14 of an aircraft 10, with the passenger service unit trough cover assembly located outboard of an overhead storage bin outboard end 20b of an overhead storage bin 20, with the passenger service unit trough cover assembly 30 further located inboard of an aircraft passenger cabin outboard wall 18, with the passenger service unit trough cover assembly panel comprising a passenger service unit trough cover assembly panel exterior surface 31a facing into the aircraft passenger cabin, with the passenger service unit trough cover assembly panel exterior surface 31a including a panel recess 32, with the recessed area of the panel recess 32 dimensioned to house a passenger service unit trough cover assembly panel handle 34 in a passenger service unit trough cover assembly panel handle stowed configuration.

In a further present aspect, the method 100 for modifying a passenger service unit trough cover assembly 30 in an aircraft passenger cabin further includes engaging 104 the passenger service unit trough cover assembly panel 31 with at least one passenger service unit trough cover assembly structural support element 22, with the at least one passenger service unit trough cover assembly structural support element configured to support the passenger service unit trough cover assembly panel, with the passenger service unit trough cover assembly structural support element further configured to support a weight imposed on the passenger service unit trough cover assembly panel handle.

As shown in FIG. 13, another present aspect is directed to a method 200 for assisting/stabilizing passenger ingress into and egress from an aircraft passenger seat assembly, with the method 200 including providing 202 a PSU trough cover panel in a stowed configuration, and deploying 204 a passenger service unit trough cover assembly panel handle 34 from a passenger service unit trough cover assembly panel stowed configuration into a deployed configuration. The passenger service unit trough cover assembly panel is located in an aircraft passenger cabin 14 of an aircraft 10 at a location outboard of an overhead storage bin outboard end 20*b* of an overhead storage bin 20, and further at a location inboard of an aircraft passenger cabin outboard wall 18, with the passenger service unit trough cover assembly panel comprising a passenger service unit trough cover assembly panel exterior surface 30*a* facing into the aircraft passenger cabin, said passenger service unit trough cover assembly panel exterior surface comprising a panel recess 32, and with the panel recess 22 dimensioned to house the passenger service unit trough cover assembly panel handle 34 in a passenger service unit trough cover assembly panel handle stowed configuration.

In another present aspect, a method 200 further includes engaging 206 the passenger service unit trough cover assembly panel handle with a weight load of a passenger during at least one of a passenger ingress into a passenger seat assembly 16 passenger and passenger egress from the passenger seat assembly 16, and stabilizing 208 a passenger during at least one of the passenger ingress into a passenger seat assembly 16 passenger and the passenger egress from the passenger seat assembly 16.

The methods 100, 200 outlined in FIGS. 12 and 13, and disclosed herein, can include the apparatuses disclosed herein and that can be of the type shown in at least one of FIGS. 1, 2A, 2B, 3, 4, 5, 6, 7, 8A, 8B, 8C, 9, 10, and/or 11.

As stated herein, the present apparatuses afford increased passenger comfort, maneuverability, and independence at least during ingress into and egress out from passenger seating where maneuverability is typically constrained. According to further present aspects, the ability of the PSU trough cover assembly handle to retract or return to a stowed position (e.g., a stowed configuration) within a panel recess insures that sightlines throughout a passenger cabin remain clear and unobstructed from any assembly element descending from a trough cover assembly that could obstruct such passenger cabin sightlines.

In addition, present aspects further contemplate the present PSU trough cover assembly handle placed in communication with a signaling device (referred to equivalently herein as a "signaling element") at least for the purpose of relaying or transmitting information on the condition of the handle (e.g., the handle being in a stowed or deployed configuration, etc.) specific to a particular aircraft passenger cabin seating location to at least one of a receiver, a controller, and/or a display at least for the purpose of, for example, alerting flight crew of a particular passenger properly or improperly occupying a particular seat during, for example, takeoff, landing, etc.

In other present aspects, the PSU trough cover assembly panel handle, panel recess, and/or the panel itself can include an illumination source that can be a lighting assembly to facilitate handle location by a passenger, and/or to signal when a particular handle is in use (e.g., deployed, etc.). Such illumination source can be, a lighting assembly (e.g., comprising LEDs, etc.) comprised within the panel, the handle, the recess, etc, or the illumination source can be located near the handle, with light beams configured to illuminate the handle. In addition, PSU trough cover assembly panels and/or panel handles can further comprise one or more layers of luminescent material that can absorb light energy in the presence of light, and that can release absorbed light energy in the absence of light to appear "illuminated" for a selected duration, for example.

As stated herein, the PSU trough cover assembly can comprise a unitary, or one piece assembly with various integral panels associated for use with a variety of PSU functions including, for example, a lighting assembly, a passenger information unit assembly, an oxygen deployment assembly, air conditioning/blower vent assembly, and a speaker assembly, etc. In addition, present aspects contemplate a PSU trough cover assembly comprising a plurality of associated discrete panels that, in combination, form the PSU trough cover assembly, with the discrete panels configured for use with selected dedicated function that can include, for example, a passenger information unit assembly panel, an oxygen deployment assembly panel, an air conditioning/blower vent assembly panel, a speaker assembly panel, and spacer panels with no particular assembly function assigned to the panel. Present aspects can facilitate retrofitting a PSU trough cover assembly by, for example, replacing a spacer panel with the presently disclosed PSU trough cover assembly panels that comprise the PSU trough cover assembly panel handle.

While the present FIGS. illustrate an outboard PSU trough (associated with a PSU trough cover assembly) located or otherwise positioned within an aircraft passenger cabin adjacent an outboard cabin wall, further present aspects are directed to centerboard PSU troughs and associated PSU trough cover assemblies located at or near the center of an aircraft and/or at least located inboard of one or more aircraft aisles, with the cover assembly panels outfitted with the presently disclosed PSU trough cover assembly panel handles located at least over, adjacent to, and/or otherwise reachable from, for example, the center seats of seating assemblies positioned at or near the center of an aircraft.

The term positioned "substantially", "substantially" adjacent, "substantially" housed within, etc., as used herein means that a particular physical element is almost completely or is nearly completely positioned or adjacent to and/or is nearly entirely housed within another stated element.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed is:

1. A load-bearing aircraft passenger cabin overhead passenger seat ingress/egress stabilizer assembly comprising: a load-bearing aircraft passenger service unit trough cover assembly comprising: a passenger load-bearing aircraft passenger service unit trough cover assembly panel in the form of a modified trough cover assembly spacer panel configured to comprise a passenger load-bearing passenger service unit trough cover assembly panel handle, said passenger load-bearing passenger service unit trough cover assembly panel handle configured to pivot between a passenger load-bearing passenger service unit trough cover assembly panel handle stowed configuration and a passenger load-bearing passenger service unit trough cover assembly panel handle deployed configuration, said passenger service unit trough cover assembly panel and said passenger load-bearing passenger service unit trough cover assembly panel handle located outboard of an overhead storage bin outboard end of overhead storage bin, said passenger service unit cover assembly panel and said passenger load-bearing passenger service unit trough cover assembly panel handle further located inboard of an aircraft passenger cabin outboard wall; a passenger service unit trough cover assembly panel exterior surface facing into an aircraft passenger cabin, said passenger service unit trough cover assembly panel exterior surface comprising a panel recessed area, said panel recessed area at least partially bounded by a panel recessed area floor and a panel recessed area wall, said panel recessed area dimensioned to house the passenger load-bearing passenger service unit trough cover assembly panel handle in the passenger load-bearing passenger service unit trough cover assembly panel handle stowed configuration; a passenger service unit trough cover assembly panel support element positioned immediately adjacent to a passenger service unit trough cover assembly panel interior surface, said passenger service unit trough cover assembly panel fixedly attached to the passenger service unit trough cover assembly panel support element; wherein the at least one passenger service unit trough cover assembly support element is at least one of an air conditioning extrusion rail and a passenger service unit rail; wherein said at least one passenger load-bearing aircraft passenger service unit trough cover assembly panel is configured to at least withstand a downward load-bearing force on the load-bearing aircraft passenger service unit trough cover assembly panel ranging from about 350 lbs. to about 500 lbs.; and wherein the passenger load-bearing passenger service unit trough cover assembly panel handle in a deployed handle state is configured to assist a passenger ingress into at least one of a center passenger seat and a window passenger seat and is further configured to assist a passenger egress from at least one of a center passenger seat and a window passenger seat.

2. The load-bearing aircraft passenger service unit trough cover assembly of claim 1, further comprising a plurality of passenger cabin passenger service unit trough cover assembly panels.

3. The load-bearing aircraft passenger service unit trough cover assembly of claim 1, wherein the load-bearing aircraft passenger cabin passenger service unit trough cover assembly is a unitary assembly.

4. An aircraft passenger cabin comprising the load-bearing aircraft passenger service unit trough cover assembly of claim 1.

5. An aircraft comprising the load-bearing aircraft passenger service unit trough cover assembly of claim 1.

6. The load-bearing aircraft passenger service unit trough cover assembly of claim 1, wherein the at least one passenger service unit trough cover assembly support element is the air conditioning extrusion rail.

7. The load-bearing aircraft passenger service unit trough cover assembly of claim 1, wherein the at least one passenger service unit trough cover assembly support element is the passenger service unit rail.

8. A load-bearing aircraft passenger service unit trough cover assembly spacer panel comprising:

a passenger load-bearing passenger service unit trough cover assembly panel handle, said passenger load-bearing passenger service unit trough cover assembly panel handle configured to pivot between a passenger load-bearing passenger service unit trough cover assembly panel handle stowed configuration and a load-bearing passenger service unit trough cover assembly panel handle deployed configuration, said passenger service unit trough cover assembly panel and said passenger load-bearing passenger service unit trough cover assembly panel handle located outboard of an overhead storage bin outboard end of overhead storage bin, said passenger service unit cover assembly panel and said passenger load-bearing passenger service unit trough cover assembly panel handle further located inboard of an aircraft passenger cabin outboard wall;

a passenger service unit trough cover assembly panel exterior surface facing into an aircraft passenger cabin, said passenger service unit trough cover assembly panel exterior surface comprising a panel recessed area, said panel recessed area at least partially bounded by a panel recessed area floor and a panel recessed area wall, said panel recessed area dimensioned to house the passenger load-bearing passenger service unit trough cover assembly panel handle in the passenger load-bearing passenger service unit trough cover assembly panel handle stowed configuration;

a passenger service unit trough cover assembly panel interior surface;

wherein said at least one load-bearing aircraft passenger service unit trough cover assembly spacer panel is configured to fixedly engage a passenger service unit trough cover assembly panel support element to the passenger service unit trough cover assembly panel interior surface;

wherein said at least one load-bearing aircraft passenger service unit trough cover assembly spacer panel is configured to at least withstand a downward passenger load-bearing force on the load-bearing aircraft passenger service unit trough cover assembly spacer panel ranging from about 350 lbs. to about 500 lbs; and wherein the passenger load-bearing passenger service unit trough cover assembly panel handle in the deployed configuration is configured to assist a passenger ingress into at least one of a center passenger seat and a window passenger seat, and is further configured to assist a passenger egress from at least one of a center passenger seat and a window passenger seat.

9. The load-bearing aircraft passenger service unit trough cover assembly spacer panel of claim 8, wherein the passenger load-bearing passenger service unit trough cover assembly panel handle is in communication with a signaling element, said signaling element configured to relay a condition of the passenger load-bearing passenger service unit trough cover assembly panel handle to a display.

10. The load-bearing aircraft passenger service unit trough cover assembly spacer panel of claim 8, wherein at least one of the passenger service unit trough cover assembly panel exterior surface, the panel recessed area, and the passenger service unit trough cover assembly is illuminated.

11. The load-bearing aircraft passenger service unit trough cover assembly spacer panel of claim 8, wherein the passenger service unit trough cover assembly panel exterior surface further comprises a luminescent material.

12. The load-bearing aircraft passenger service unit trough cover assembly spacer panel of claim 8, wherein the at least one passenger service unit trough cover assembly support element is at least one of an air conditioning extrusion rail and a passenger service unit rail.

13. The load-bearing aircraft passenger service unit trough cover assembly spacer panel of claim 12, wherein the passenger service unit trough cover assembly spacer panel is configured to fixedly engage both the air conditioning extrusion rail and the passenger service unit rail.

14. An aircraft passenger cabin comprising the load-bearing aircraft passenger service unit trough cover assembly spacer panel of claim 8.

15. An aircraft comprising the load-bearing aircraft passenger service unit trough cover assembly spacer panel of claim 8.

16. The load-bearing aircraft passenger service unit trough cover assembly spacer panel of claim 8, wherein the at least one passenger service unit trough cover assembly support element is an air conditioning extrusion rail.

17. The load-bearing aircraft passenger service unit trough cover assembly spacer panel of claim 8, wherein the at least one passenger service unit trough cover assembly support element is the passenger service unit rail.

18. The load-bearing aircraft passenger service unit trough cover assembly spacer panel of claim 8, wherein at least one of the passenger service unit trough cover assembly panel exterior surface, the panel recessed area, and the passenger service unit trough cover assembly is luminescent.

19. A method for modifying an aircraft passenger cabin service unit trough cover assembly into a passenger load-bearing aircraft passenger service unit trough cover assembly, the method comprising:

positioning a passenger load-bearing aircraft passenger service unit trough cover assembly spacer panel in the aircraft passenger cabin service unit trough cover assembly to form the passenger load-bearing aircraft passenger service unit trough cover assembly, said passenger load-bearing aircraft passenger service unit trough cover assembly located outboard of an overhead storage bin outboard end of an overhead storage bin, said passenger load-bearing aircraft passenger service unit trough cover assembly further located inboard of an aircraft passenger cabin outboard wall, said at least one passenger load-bearing aircraft passenger service unit trough cover assembly spacer panel comprising a passenger service unit trough cover assembly panel exterior surface facing into the aircraft passenger cabin, said passenger service unit trough cover assembly panel exterior surface comprising a recessed area, said panel recessed area at least partially bounded by a panel recessed area floor and a panel recessed area wall, said recessed area dimensioned to house a passenger load-bearing passenger service unit trough cover assembly panel handle in a passenger load-bearing service unit trough cover assembly panel handle stowed configuration, said passenger load-bearing passenger service unit trough cover assembly panel handle configured to pivot between a passenger load-bearing passenger service unit trough cover assembly panel handle stowed configuration and a passenger load-bearing passenger service unit trough cover assembly panel handle deployed configuration;

wherein said at least one load-bearing aircraft passenger service unit trough cover assembly spacer panel further comprises a passenger service unit trough cover assembly panel interior surface positioned immediately adjacent to a passenger service unit trough cover assembly panel support element, the at least one passenger service unit trough cover assembly support element comprising at least one of an air conditioning extrusion rail and a passenger service unit rail, said passenger service unit trough cover assembly panel support element fixedly attached to the at least one of the at least one passenger service unit trough cover assembly panel interior surface and the passenger load-bearing passenger service unit trough cover assembly panel handle; and wherein said at least one passenger service unit trough cover assembly support element is configured to support the at least one load-bearing aircraft passenger service unit trough cover assembly spacer panel, said at least one passenger service unit trough cover assembly support element further configured to support a downward force in the form of a passenger weight imposed on the passenger load-bearing passenger service unit trough cover assembly panel handle, said passenger weight ranging from about 350 lbs. to about 500 lbs.

20. A method for assisting/stabilizing passenger ingress into and egress from an aircraft passenger seat assembly, the method comprising:

deploying a passenger load-bearing passenger service unit trough cover assembly panel handle from a load-bearing passenger service unit trough cover assembly spacer panel, said passenger load-bearing passenger service unit trough cover assembly panel handle deployed from a passenger service unit trough cover assembly panel handle stowed configuration to a passenger service unit trough cover assembly panel handle deployed configuration, said load-bearing passenger service unit trough cover assembly spacer panel and said passenger load-bearing passenger service unit trough cover assembly panel handle located in an aircraft passenger cabin at a location outboard of an overhead storage bin outboard end of an overhead storage bin, and further located in an aircraft passenger cabin at a location inboard of an aircraft passenger cabin outboard wall, said load-bearing passenger service unit trough cover assembly spacer panel comprising a passenger service unit trough cover assembly panel exterior surface facing into the aircraft passenger cabin, said passenger service unit trough cover assembly panel exterior surface comprising a recessed area, said panel recessed area at least partially bounded by a panel recessed area floor and a panel recessed area wall, said panel recessed area dimensioned to house the passenger load-bearing passenger service unit trough cover assembly panel handle in the passenger service unit trough cover assembly panel handle stowed configuration, said load-bearing passenger service unit trough cover assembly spacer panel fixedly attached to at least one passenger service unit trough cover assembly support element, said at least one passenger service unit trough cover assembly support element comprising at least one of an air conditioning extrusion rail and a passenger service unit rail, said passenger service unit trough cover assembly panel support element further fixedly attached to the at least one of the at least one passenger service unit trough cover assembly panel interior surface and the load-bearing passenger service unit trough cover assembly panel handle;

engaging the passenger load-bearing passenger service unit trough cover assembly panel handle with a downward force in the form of a weight load of a passenger during at least one of a passenger ingress into a passenger seat assembly and a passenger egress from the passenger seat assembly; and stabilizing a passenger during at least one of the passenger ingress into a passenger seat assembly and the passenger egress from the passenger seat assembly.

21. The method of claim 20, further comprising:

stabilizing a passenger during at least one of the passenger ingress into and egress from a center seat of a passenger seat assembly.

22. The method of claim 20, further comprising:

stabilizing a passenger during at least one of the passenger ingress into and egress from a window seat of a passenger seat assembly.

* * * * *